(12) United States Patent
Smahl

(10) Patent No.: US 7,681,928 B2
(45) Date of Patent: Mar. 23, 2010

(54) PIPE FITTING

(75) Inventor: Jarmo Smahl, Nastola (FI)

(73) Assignee: Uponor Innovation AB, Virsbo (SE)

( * ) Notice: Subject to any disclaimer, the term of this patent is extended or adjusted under 35 U.S.C. 154(b) by 356 days.

(21) Appl. No.: 10/580,598

(22) PCT Filed: Nov. 25, 2004

(86) PCT No.: PCT/FI2004/000714

§ 371 (c)(1),
(2), (4) Date: Feb. 14, 2007

(87) PCT Pub. No.: WO2005/052433

PCT Pub. Date: Jun. 9, 2005

(65) Prior Publication Data

US 2007/0241556 A1    Oct. 18, 2007

(30) Foreign Application Priority Data

Nov. 27, 2003  (FI) .................................. 20031736

(51) Int. Cl.
*F16L 15/04*      (2006.01)
*F16L 15/08*      (2006.01)
(52) U.S. Cl. ................... 285/355; 285/347; 285/379
(58) Field of Classification Search ............... 285/355, 285/390, 391, 334.1, 334.3, 347, 379; 411/82.2, 411/258, 311
See application file for complete search history.

(56) References Cited

U.S. PATENT DOCUMENTS 1,645,032 A * 10/1927 Wilson ........................ 285/27
2,477,533 A * 7/1949 Whiting ...................... 277/625
2,484,644 A   10/1949 Poupitch
2,793,884 A * 5/1957 Jungblut ..................... 285/231
3,502,355 A   3/1970 Demler et al.
3,791,679 A * 2/1974 Glover ..................... 285/132.1
3,856,065 A * 12/1974 Gehring ...................... 411/302
4,050,721 A * 9/1977 Streit ........................... 285/93
4,154,466 A   5/1979 Simmons
4,712,957 A * 12/1987 Edwards et al. ............. 411/82.1
5,133,630 A * 7/1992 Hughes ..................... 411/82.5
5,273,383 A * 12/1993 Hughes ...................... 411/311
5,452,977 A * 9/1995 Terrizzi ..................... 411/82.5
5,672,037 A * 9/1997 Iwata ......................... 411/311
6,361,083 B1 * 3/2002 Riesselmann et al. ....... 285/333
6,454,314 B1 * 9/2002 Grosspietsch et al. ....... 285/319
6,971,681 B2 * 12/2005 Dell'Erba et al. ............. 285/55
7,309,199 B2 * 12/2007 Ayrle ......................... 411/82

FOREIGN PATENT DOCUMENTS

AU          35181        3/1970
WO     WO 03/091617    11/2003

\* cited by examiner

*Primary Examiner*—James M Hewitt
(74) *Attorney, Agent, or Firm*—Occhiuti Rohlicek & Tsao LLP

(57) ABSTRACT

A pipe fitting is made of plastic, such as polysulphone PSU or polyphenylsulphone PPSU. At least one end of the pipe fitting (1) comprises an external thread (2) for connecting the pipe fitting (1) to a mounting element, such as a pipe or a mounting piece, e.g. a tap. The thread (2) comprises a ridge (3). Between the ridges (3) there is a continuous helical groove (4). On the bottom of the groove (4) between the ridges (3) of the thread (2) there are protrusions (5).

10 Claims, 1 Drawing Sheet

PIPE FITTING

CROSS-REFERENCE TO RELATED APPLICATIONS

This application is the National Stage of International Application No. PCT/FI2004/000714, filed Nov. 25, 2004, which claims the benefit of Finland Patent Application Serial No. 20031736, filed on Nov. 27, 2003. The contents of both applications are hereby incorporated by reference in their entirety.

BACKGROUND OF THE INVENTION

The invention relates to a pipe fitting, which is made of plastic, intended to act as a connection piece to join at least two mounting elements, and at least one end of which comprises a thread for connecting the pipe fitting and the mounting element to each other by means of a threaded connection.

A pipe fitting is used as a connection piece to connect, for example, a mounting piece, such as a tap, to a pipe or as a connection piece to connect a pipe to another pipe or to another similar object. Previously, mainly metallic pipe fittings were used. However, material and manufacturing costs of metallic pipe fittings are quite high. In addition, to make the connections in the metallic pipe fittings tight requires remarkable expertise. Pipe fittings can also be made of plastic. Also when plastic pipe fittings are used, it is necessary to have a good knowledge of how to make the connections tight.

BRIEF DESCRIPTION OF THE INVENTION

It is an object of the invention to provide a new and improved pipe fitting.

The pipe fitting is characterized in that on the bottom of a groove between ridges of the thread there are protrusions.

The pipe fitting is preferably made of plastic and at least its one end comprises a thread for connecting the pipe fitting to the mounting element. If the groove between the ridges of the thread is provided with protrusions, a seal to be arranged onto the threads can be fixed very firmly to its place when the mounting element and the pipe fitting are connected to each other by means of a threaded connection. Also when the threaded connection is opened, the seal remains quite well in its place. The protrusions on the bottom of the groove also make the connection tighter so that no fluid can flow along the groove of the threads. Consequently, the connections are made considerably tighter. If the threaded end of the pipe fitting is provided with an unthreaded section in the starting end of the pipe fitting, this unthreaded section acts as a guide surface for the mounting element to be arranged in the pipe fitting, whereupon the mounting element provided with a thread suitably fits into the threads of the pipe fitting. Thus, the unthreaded part acts as a guide element which hinders the mounting element from being in an inclined position with respect to the pipe fitting, which inclined position could damage the threads of the pipe fitting and/or mounting element. Thus, the tightness of the connection can also be improved by means of the unthreaded part, since the threads remain undamaged and the threaded connection can be implemented easily and properly.

BRIEF DESCRIPTION OF THE FIGURES

The invention will be described in more detail in the attached drawing, in which FIG. 1 schematically shows a side view of a pipe fitting.

DETAILED DESCRIPTION OF THE INVENTION

Figure 1:
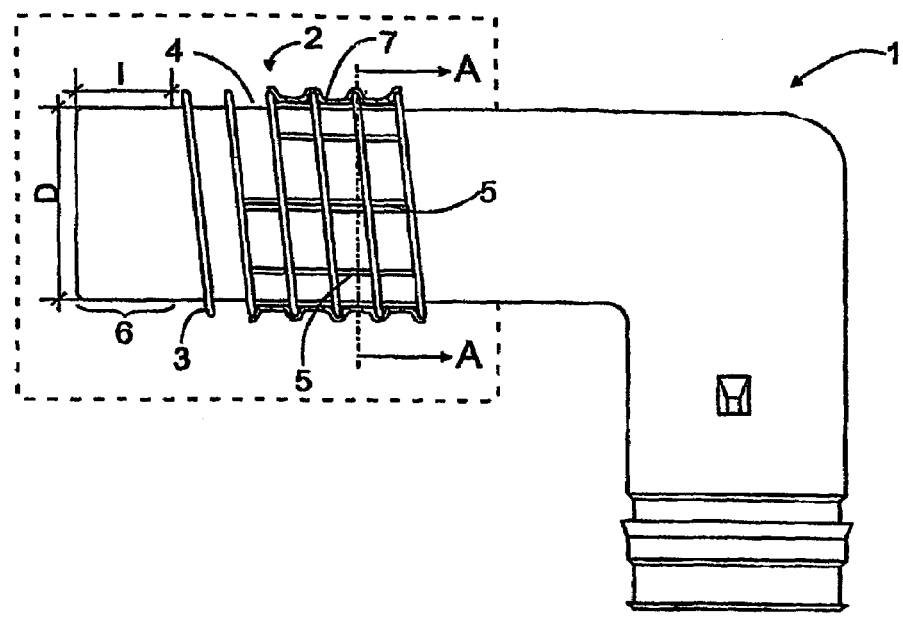

FIG. 1 shows a pipe fitting 1, i.e. a connection piece. The pipe fitting 1 is used between two or more mounting elements to connect them. The first mounting element can be, for example, a pipe or a mounting piece, such as a tap or the like, and the second mounting element can be a pipe, for instance. The pipe fitting 1 can be a bend, as shown in FIG. 1, or the pipe fitting 1 can be a straight piece, for example. Furthermore, the pipe fitting 1 can be a T-piece, which means that the pipe fitting 1 is used to connect three different mounting elements to each other. Thus, the appearance and purpose of use of the pipe fitting 1 can vary within very broad limits.

The pipe fitting 1 is made of plastic, such as polyethylene PE, polypropylene PP, cross-linked polyolefin plastic, such as cross-linked polyethylene PEX, polyamide PA, polysulphone PSU, polyphenylsulphone PPSU or polyvinyldene fluoride PVDF. If desired, additives, such as a reinforcement, e.g. glass fibre, can be mixed into the plastic.

At the first end of the pipe fitting 1 there is an external thread 2. The thread 2 comprises a ridge 3. Between the ridges 3 there is a continuous helical groove 4.

On the bottom of the groove 4 there are protrusions 5. The pipe fitting 1 is connected by means of the thread 2 to the mounting element provided with an internal thread. In FIG. 1, the mounting element is shown symbolically by means of a broken line. A seal is arranged in the threaded connection between the external thread 2 of the pipe fitting 1 and the internal thread of the mounting element in order to secure the tightness of the threaded connection. Due to the protrusions 5, the seal 7 remains in its place at the thread 2 when the threaded connection is implemented. Furthermore, when the connection is opened, the protrusions 5 keep the seal 7 in its place. The protrusions 5 also prevent the leaking of the threaded connection by hindering the fluid from flowing along the bottom of the groove 4.

For example, a sealing strip, sealing tape, hemp or some other sealing can be used as a seal in a manner known per se. If the pipe fitting 1 is made of polyphenylsulphone PPSU, a sealing material with a trade name Loctite 5061 has proven to be a good seal. The seal 7 is preferably arranged in connection with the pipe fitting 1 already during the manufacture of the pipe fitting 1 at the factory. Thus, it is ensured that a proper kind of sealing material is used and that the seal is properly arranged in connection with the thread 2.

The protrusions 5 do not necessarily extend to the starting end of the thread 2, and thus the starting end of the groove 4 can have an even bottom. This makes it easier to implement the threaded connection and the threads are set against each other easily. In FIG. 1, the protrusions 5 are arranged in the same line with each other in the successive grooves, whereby the protrusions 5 form axial ribs. Thus, the manufacture of the pipe fitting 1 by means of injection moulding, for instance, is as simple as possible and it is easy to form an injection mould, for example. For the sealing effect, however, it is not necessary that the protrusions in the successive grooves are in the same line with each other but they may even be arranged randomly around the pipe fitting 1. On the other hand, the protrusions 5 can be arranged to form the ribs at an angle diverging from the axial direction.

Figure 2:
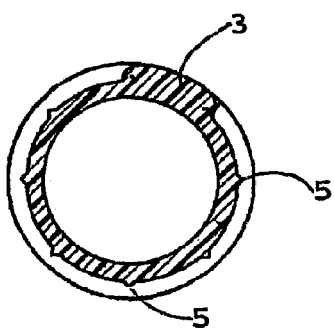
FIG. 2 shows a cross-section of the pipe fitting of FIG. 1, taken along the line A-A of FIG. 1.

There can be, for instance, 2 to 24 protrusions 5 that are arranged at one point around the circumference, i.e. at a distance covered by one pitch. Typically, there are 4 to 8 protrusions at one point around the circumference. In the case of FIGS. 1 and 2, there are eight protrusions 5 around the circumference.

The height of the protrusion 5 depends on the diameter of the pipe fitting 1 and the height of the ridge 3. The height of the protrusion 5 is typically 10 to 50% of the height of the ridge 3, for instance. The height of the protrusion 5 can vary between 0.2 and 2 mm, for example. The diameter D of the pipe fitting can vary between 10 and 30 mm, for example.

At the first end of the pipe fitting 1 provided with the thread 2 there can be an unthreaded section 6 in the starting end before the thread 2. The unthreaded section 6 forms a guide surface, which guides the pipe fitting 1 and the mounting element to be connected thereto with respect to one another in such a manner they have parallel middle axes. Consequently, the threads are set precisely against each other and it is easy to implement a threaded connection and the threads will not get damaged. Furthermore, the unthreaded section 6 provides the advantage that at the point where the thread 2 starts, the wall of the pipe fitting 1 has a greater strength than at the very end of the pipe fitting. At the thread 2 the wall is not as elastic as at the end of the pipe fitting and due to the mould technique, the wall of the end part of the injection mould section must be made slightly thinner so that the section of the mould to be arranged inside the casting can be separated after the casting. Due to the unthreaded section 6, the thread 2 starts where the wall is a bit thicker than at the end of the pipe fitting 1. Consequently, it is easier to keep the thread 2 unchanged and the connection becomes very tight.

Typically, the length I of the unthreaded section equals to the pitch of ca. 1 to 2 threads. Preferably, the ratio of the length I of the unthreaded section 6 to the diameter D of the pipe fitting 1 is greater than 1:6. Particularly preferably the ratio of the length I of the unthreaded section 6 to the diameter D of the pipe fitting 1 is greater than 1:4.

The drawings and the related description are only intended to illustrate the idea of the invention. In its details, the invention can vary within the scope of the claims. The pipe fitting 1 can have any single feature described above either individually or in combination with other features. For example, the pipe fitting 1 can have the unthreaded part 6 before the thread 2, but it need not necessarily have protrusions 5 on the bottom of the groove 4 then. A very good tightness is provided in this case, too. If desired, the protrusions 5 can be made of a softer material than the rest of the pipe fitting. Thus, when the threaded connection is implemented, the protrusions are shaped because of the pressing of the threads of the mounting element. Furthermore, the protrusions can, if desired, also be arranged in a position diverging from the axial direction, i.e. obliquely in either direction. In this case, the protrusions wedge the sealing material towards the ridge, providing a better tightness. Furthermore, the protrusions 5 need not necessarily extend from one ridge to another but the seal remains in its place also when at least a part of the distance between the ridges is uneven. The upper surface of the protrusions 5 can be straight, as shown in FIG. 1, or the upper surface of the protrusions 5 can be convex or concave, for example.

The invention claimed is:

1. A pipe fitting, which is made of plastic, intended to act as a connection piece to join at least two mounting elements, comprising a thread on at least one end of the pipe fitting, the thread configured to connect the pipe fitting and one of the at least two mounting elements to each other by means of a threaded connection; and a seal on the thread, wherein on the bottom of a groove between ridges of the thread there are protrusions configured to keep the seal in place.

2. A pipe fitting as claimed in claim 1, wherein the height of the protrusions is 10 to 50% of the height of the ridges.

3. A pipe fitting as claimed in claim 1, wherein at the starting end of the thread the bottom of the groove does not comprise protrusions at least at the distance of one pitch.

4. A pipe fitting as claimed in claim 1, wherein the protrusions are arranged in the successive grooves in such a manner that the protrusions form ribs.

5. A pipe fitting as claimed in claim 4, wherein the protrusions are arranged in the same line with each other in the axial direction such that they form axial ribs.

6. A pipe fitting as claimed in claim 1, wherein the thread is arranged at a distance from the end of the pipe fitting in such a manner that the end of the pipe fitting comprises an unthreaded section acting as a guide surface.

7. A pipe fitting as claimed in claim 6, wherein the ratio of the length of the unthreaded section to the diameter of the pipe fitting is greater than 1:6.

8. A pipe fitting as claimed in claim 1, wherein there are 2 to 24 protrusions at one point around the circumference of the pipe fitting.

9. A pipe fitting as claimed in claim 1, wherein the upper surface of each of the protrusions is straight.

10. A pipe fitting as claimed in claim 2, wherein at the starting end of the thread the bottom of the groove does not comprise protrusions at least at the distance of one pitch.

\* \* \* \* \*